Nov. 6, 1928.

I. E. McCABE 1,690,689

PRESSURE ACTUATED ELECTRIC CIRCUIT CONTROL

Filed April 12, 1926    3 Sheets-Sheet 1

INVENTOR.
IRA E. McCABE
BY Langdon Moore
ATTORNEYS.

Patented Nov. 6, 1928.

1,690,689

UNITED STATES PATENT OFFICE.

IRA E. McCABE, OF CHICAGO, ILLINOIS.

PRESSURE-ACTUATED ELECTRIC-CIRCUIT CONTROL.

Application filed April 12, 1926. Serial No. 101,589.

This invention relates to improvements in pressure-actuated electric circuit controls and more particularly to a device of this character which in operating to break the circuit therethrough first gradually reduces the strength of the current much in the manner of a conventional rheostat, but by the employment of a variable resistance means of novel form, until the circuit is broken by the switch and when operated to close the circuit allows the full strength of current to pass therethrough.

It is an object of this invention to provide a control of this character which may be employed wherever an electric circuit is desired to be controlled by the pressure or temperature of an associated element or structure.

While this device may have many uses, for the purpose of describing its construction and operation, it is illustrated herein in connection with an electrically operated liquid fuel burner system, yet it is to be understood that the invention is not limited to this embodiment and that minor detail changes may be made in its construction and mode of operation when applied to other uses without departing from the scope of the invention.

In the embodiment of this invention illustrated herein the device is employed as a boiler control which will operate when the pressure within the boiler becomes greater than a predetermined degree to break the electric circuit in which the device is a part.

Figure 1:
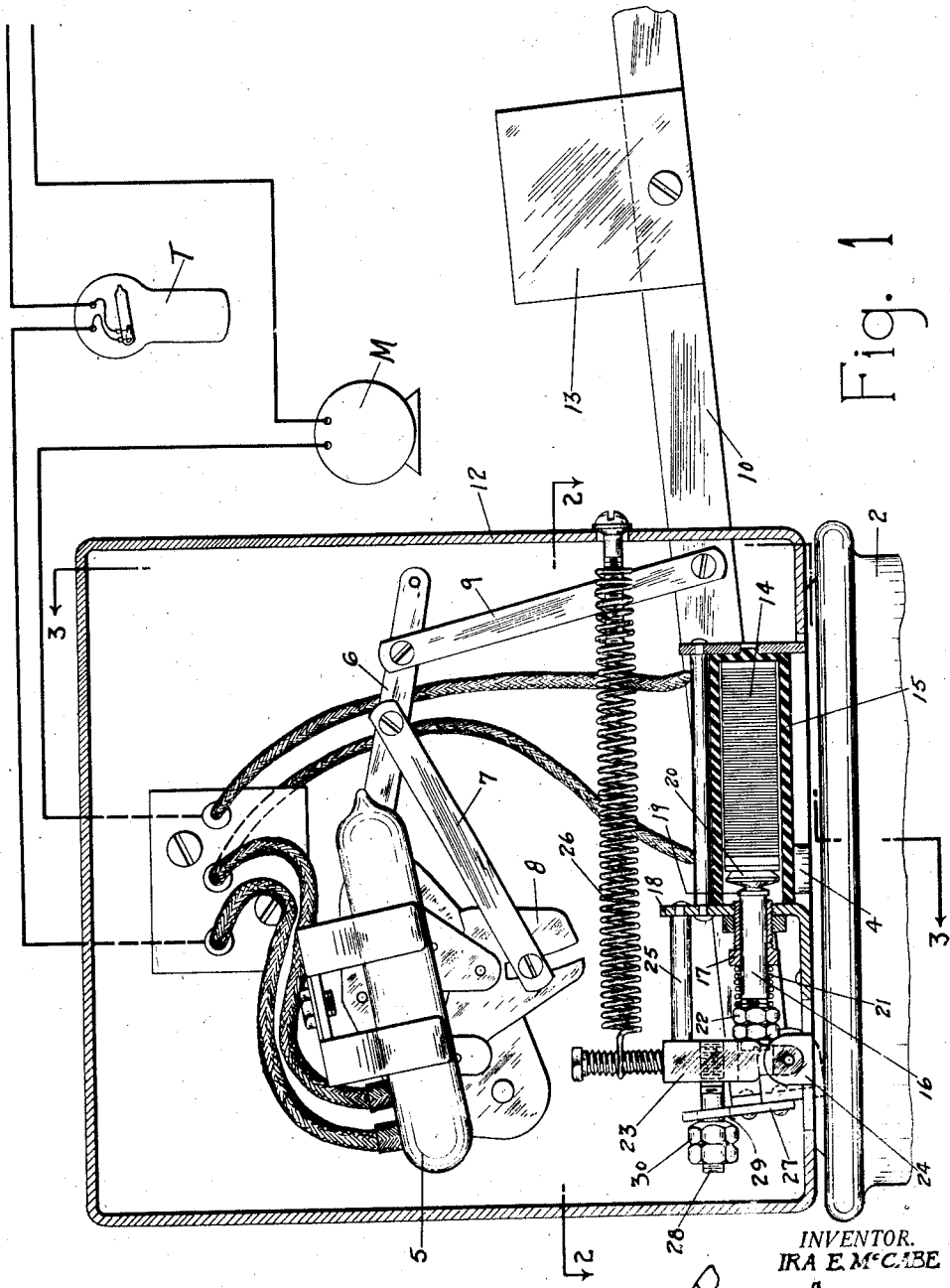
Figure 1 is a view in side elevation, with parts broken away and partly in section, of an embodiment of this invention illustrating diagrammatically its application to a circuit including an electric motor and room thermostat as employed in an electrically operated liquid fuel burner heating system.
Figure 2:
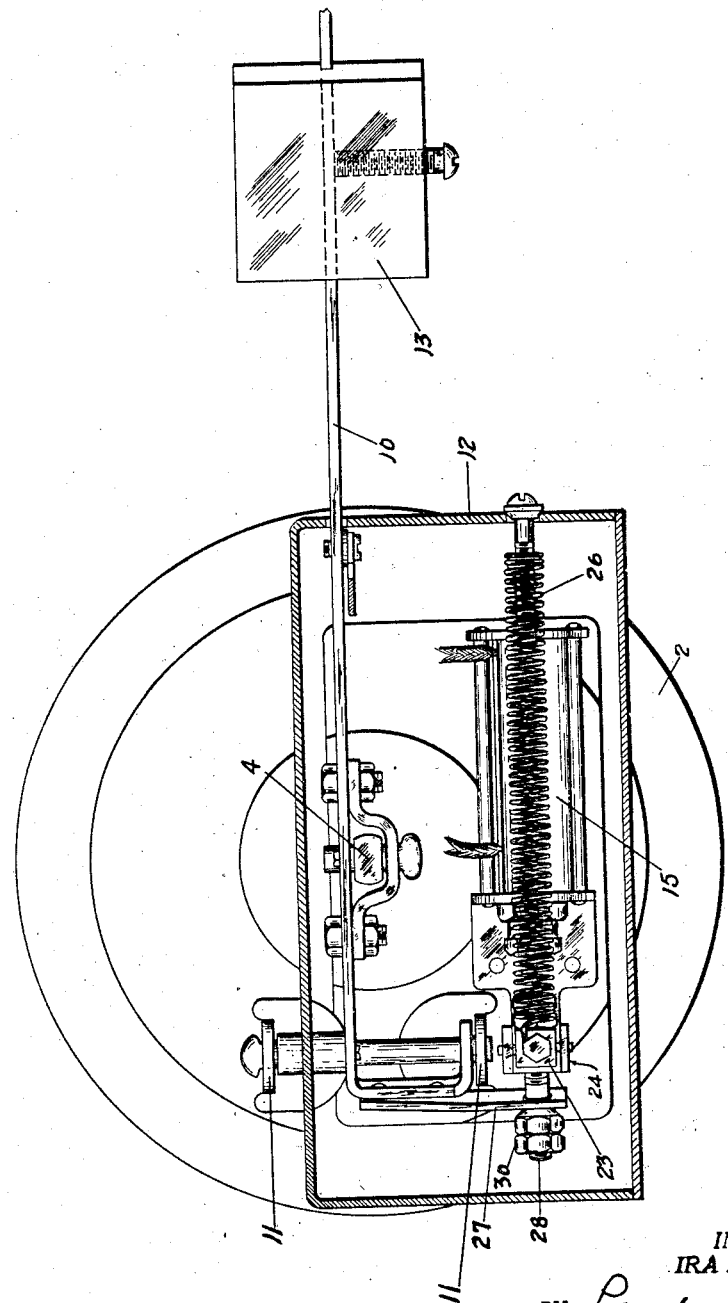
Figure 2 is a top plan view of the instrument shown in Figure 1, partly in section, with the top of the casing broken away on the line 2—2 of Figure 1, and omitting the parts above said line.
Figure 3:
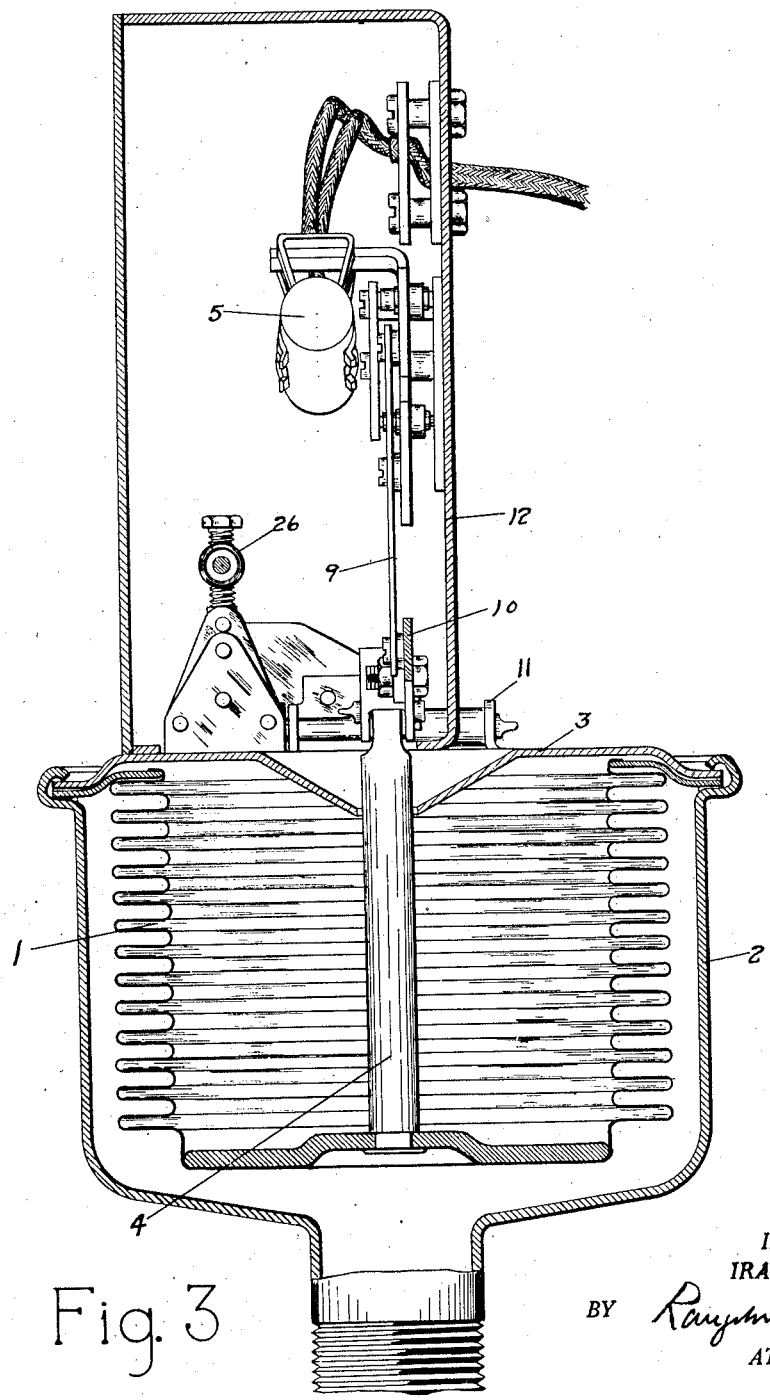
Figure 3 is a view in vertical section taken on the line 3—3 of Figure 1 looking in the direction of the arrows illustrating the expansible and contractible element in the central vertical section.

As illustrated in Figure 1, this device is employed in a motor circuit controlled by a room thermostat T in which a lead from the commercial line passes through the room thermostat, through this particular control to the electric motor M and from the motor back to the commercial line. The mechanism of this device is operative by an expansible and contractible member in the form of a metallic bellows 1 mounted in a casing 2 in which the top 3 of the bellows forms the top of the casing, with a central shaft 4 secured to the bottom of the bellows passing through and extending beyond the top 3. The casing which surrounds the bellows is communicated with the interior of the boiler so that as the pressure increases and decreases within the boiler, the bellows will be expanded and contracted thereby. The circuit from the room thermostat to the electric motor is controlled by an electric mercury tube switch 5 mounted on a snap movement operating mechanism similar to that described in my prior pending application Serial No. 585,698, filed September 1st, 1922, having one terminal of the mercury tube switch in circuit with the room thermostat and the other terminal in circuit with a variable resistance element interposed between that terminal and the motor. The mechanism of the switch is operated by the movement of an operating lever 6 pivoted at one end to the switch mechanism and having a link 7 connected to the switch actuator 8 which upon movement of the free end of the operating lever in a downward direction will operate the mechanism to throw the mercury tube to close the circuit therethrough and upon a movement of the free end of the operating lever in an upward direction will operate to throw the switch to open the circuit therethrough. The free end of the operating lever 6 is connected by a pivoted link 9 to a pressure operated lever 10 pivoted at one end to bearings 11 on the top of the bellows casing 3, which lever is arranged to be engaged on its under side by the bellows shaft 4 and extends through an aperture in the casing 12 with a slidable weight 13 carried on the free end thereof, which weight is adjustable to predetermine the amount of pressure necessary within the boiler to raise the lever, causing it to rotate about its pivot and through its connecting link 9 to operate the switch to break the circuit passing therethrough.

The resistance element interposed between the switch and the motor comprises a plurality of super-imposed graphite disks 14 arranged within an insulating tubular casing 15 closed at one end and carried in fixed relation upon the top of the bellows casing 3 with the opposite ends of the series of disks connected by leads to the switch terminal and to the motor circuit respectively. The amount of current passing through this resistance element varies in direct proportion to the amount of pressure applied to the series of graphite disks. In order to vary the pressure upon the disks, a pressure shaft 16 is mounted in line with the center of said series of disks and adapted to slide within an adjustable bearing or bushing 17 threaded into an end plate 18 fastened to the top of the bellows housing. The interior end of the pressure shaft is provided with an enlarged head 19 adapted to engage the bushing 17 when moved in one direction and to engage an insulating end plate 20 resting upon the series of disks when moved in the opposite direction. The pressure shaft is normally held with its interior enlarged end 19 in contact with the adjustable bushing 17 by a coiled spring 21 surrounding the outer end of the shaft engaging the bushing at one end and engaged by adjusting nuts 22 mounted on the other end. The outer end of the pressure shaft is adapted to be engaged by a pivoted control member 23 preferably mounted in bearings 24 which is an integral part of bracket 18 and held in engagement with the free end of the pressure shaft and a stop 25 extending from the upper portion of the end plate mounting 18 by an adjustable coil spring 26 secured at one end to the pivoted control member 23 and at the other end to the switch casing 12 by a member adapted to adjust the tension of said spring. By this construction the pressure shaft may be adjusted to exert sufficient pressure upon the series of super-imposed graphite disks to allow the maximum amount of current to pass therethrough when the mercury tube switch is closed and the room thermostat closes the motor circuit.

In order to increase the resistance as the pressure within the boiler increases and before the pressure-operated arm throws the mercury tube switch to break the circuit for gradually slowing the speed of the motor before its circuit is broken, the pivoted end of the pressure operated lever is provided with means for gradually reducing the effect of the coil spring causing the plunger to compress the series of superimposed graphite disks. This means is illustrated in the present embodiment as comprising an operating plate 27 secured at right angles to the pressure operated lever adapted to co-act with a screw-threaded stud 28 secured to the pivoted control member 23 which stud passes through an aperture 29 in the plate and is provided with adjustable nuts 30 therebeyond which are engaged by the plate when the pressure operating lever is rotated in an upward direction by the bellows shaft, causing the control member 23 to be moved to the left about its pivot against spring 26 and in so doing, ceases to exact pressure upon the pressure shaft 16, whereupon the pressure shaft spring 21 causes the shaft to move in the same direction thereby gradually relieving the pressure upon the series of superimposed graphite disks. As the pressure operated lever rotates in the downward direction the spring 26 returns the control member to a vertical position and in so doing exerting pressure upon the nut 22 on the pressure shaft overcomes tension of the spring 21 and places the series of superimposed graphite disks at the predetermined adjusted pressure.

What I claim is:—

1. In a pressure operated electric circuit control, an expansible and contractible element, an electric switch in the circuit to be controlled, means actuated by the expansible and contractible element to operate the switch to open and close the circuit, a pressure responsive electric conducting element of varying resistance in the circuit at one side of the switch, and means actuated by the movement of the switch operating means to vary the pressure upon said element in proportion to the direction and amount of movement of said switch operating means.

2. In a pressure operated electric circuit control, and expansible and contractible element, an electric switch in the circuit to be controlled, means actuated by the expansible and contractible element to operate the switch to open and close the circuit, a pressure responsive electric conducting element of varying resistance in the circuit at one side of the switch, and means actuated by the movement of the switch operating means to vary the pressure upon said element in proportion to the direction and amount of movement of said switch operating means, to vary the strength of electric circuit during the actuation of the switch operating means.

3. In a pressure operated electric circuit control, an expansible and contractible element, an electric switch in the circuit to be controlled, means actuated by the expansible and contractible element to operate the switch to open and close the circuit, a pressure responsive electric conducting element of varying resistance in the circuit at one side of the switch, adjustable means for pre-determining the normal resistance thereof, and means actuated by the movement of the switch operating means to vary the pressure upon said element in proportion to the amount of movement of said switch operating means in breaking the circuit.

4. In a pressure operated electric circuit control, an expansible and contractible element, an electric switch in the circuit to be controlled, means actuated by the expansible and contractible element to operate the switch to open and close the motor circuit, a pressure responsive electric conducting element of variable resistance in the circiut at one side of the switch, and means actuated by the movement of the switch operating means to decrease the pressure upon said element in proportion to the amount of movement of said switch operating means as it moves to break the circuit.

IRA E. McCABE.